(No Model.)
J. SWAN.
HOLLOW AUGER.
No. 520,502. Patented May 29, 1894.
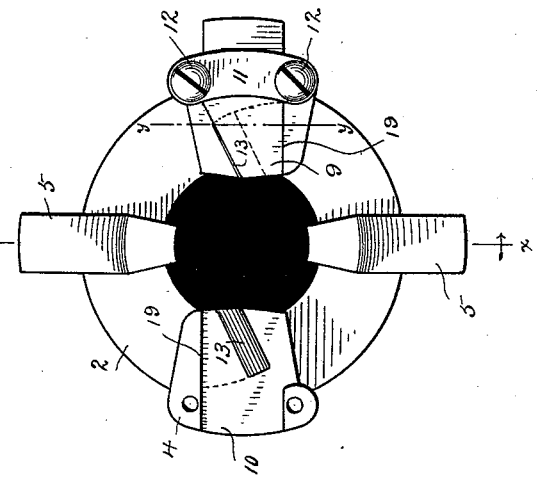
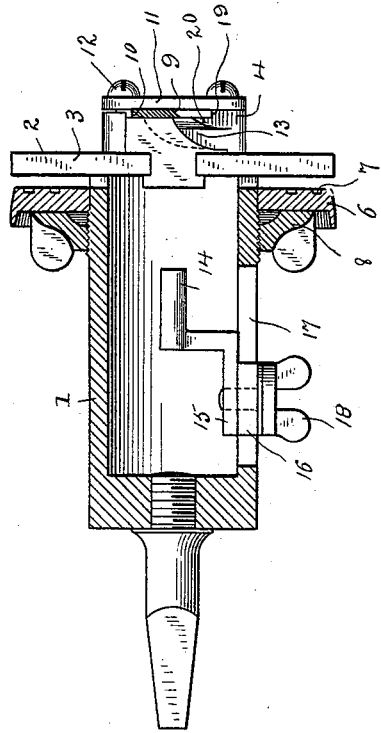
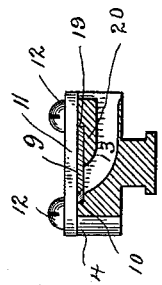
WITNESSES
H. A. Lamb
S. V. Richardson
INVENTOR
James Swan
by
A. M. Wooster
Atty.

UNITED STATES PATENT OFFICE.

JAMES SWAN, OF SEYMOUR, CONNECTICUT.

HOLLOW AUGER.

SPECIFICATION forming part of Letters Patent No. 520,502, dated May 29, 1894.

Application filed February 12, 1894. Serial No. 499,869. (No model.)

*To all whom it may concern:*

Be it known that I, JAMES SWAN, a citizen of the United States, residing at Seymour, in the county of New Haven and State of Connecticut, have invented certain new and useful Improvements in Hollow Augers; and I do hereby declare the following to be a full, clear, and exact description of the invention, such as will enable others skilled in the art to which it appertains to make and use the same.

My invention relates to the class of hollow augers illustrated and described in expired patent to Austin F. Cushman, No. 106,919, dated August 30, 1870, and has for its object to simplify and strengthen the construction and to greatly improve the operation in use.

With this object in view I have devised the simple and novel construction which I will now describe referring by numbers to the accompanying drawings forming part of this specification, in which—

Figure 1 is a longitudinal section of my improved hollow auger on the line $x\,x$ in Fig. 2, the steadying dogs being removed; Fig. 2 a front elevation thereof one of the cutters being removed to show the face of the cutters slide, and Fig. 3 is a section on the line $y\,y$ in Fig. 2.

1 denotes the hollow spindle having formed integral therewith a face plate 2 which is provided with radial slots 3 to receive the cutter slides 4 and steadying dogs 5. The face plate may be provided with any number of grooves, in the present instance I have shown two cutter slides and two steadying dogs which of course require four grooves in the face plate. The cutter slides and steadying dogs are operated by means of a disk 6 which turns freely on the spindle and is provided with a spiral groove 7. This groove is engaged by ribs, not shown, on the under sides of the cutter slides and steadying dogs so that rotation of the disk will move the cutter slides and steadying dogs in or out as may be required.

8 denotes a locking ring which engages an exterior screw thread on the spindle back of disk 6. This ring when screwed up to place locks the disk and with it the cutter slides and steadying dogs in any desired position after adjustment. As these details of construction are identical in my present hollow auger with those set forth and described in the expired patent referred to, further description is not thought to be required in this specification.

Each of the cutter slides is provided with a downwardly and rearwardly inclined slot 13 as clearly shown in Fig. 3, both ends and the front of said slot being open as shown in Fig. 1. Above this slot in each cutter slide is an inwardly extending arm 20 which is made integral with the cutter slide itself and is provided with a shoulder 19, said arm and shoulder forming a support and backing for the cutter so that strain is entirely removed from the cutter in use.

9 denotes the cutters the cutting edges of which are beveled on the under sides as clearly shown and which extend over slots 13 as clearly shown in Figs. 1 and 3 but not closing the slots there being ample space for the chips removed by the cutters to pass away through slots 13. The rear ends of the cutters lie in grooves 10 in the cutter slides and are locked in position in any suitable manner, for example by means of plates 11 which rest upon the cutters and are secured to the cutter slides by screws 12.

14 denotes a stop which I preferably use to limit the inward movement of the piece of wood that is being operated upon. This stop is provided with a base 15 and a lug 16 which slides in a slot 17 in the hollow spindle. The stop is locked in position after adjustment by a thumb screw 18 which engages the lug.

Having thus described my invention, I claim—

In a hollow auger the combination with the hollow spindle and face plate, of cutter slides each of which is provided with a downwardly and rearwardly inclined slot 13 and over said slot with an inwardly extending arm 20 made integral with the slide and provided with a shoulder 19, cutters the forward ends of which rest upon said arms and bear against the shoulders so that strain is entirely removed from the cutters in use, and plates 11 secured to the cutter slides by which the cutters are held in place.

In testimony whereof I affix my signature in presence of witnesses.

JAMES SWAN.

Witnesses:
S. HART CULVER,
EDWARD N. TUCKER,
F. H. TUCKER.